（12) United States Patent
Zauritz

(10) Patent No.: US 11,097,681 B2
(45) Date of Patent: Aug. 24, 2021

(54) VEHICLE SEAT WITH AN AIRBAG UNIT AND AIRBAG UNIT ADAPTED FOR THE USE IN A VEHICLE SEAT

(71) Applicant: AUTOLIV DEVELOPMENT AB, Vargarda (SE)

(72) Inventor: Ralf Zauritz, Holzkirchen (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 49 days.

(21) Appl. No.: 16/461,638

(22) PCT Filed: Nov. 17, 2017

(86) PCT No.: PCT/EP2017/079547
§ 371 (c)(1),
(2) Date: May 16, 2019

(87) PCT Pub. No.: WO2018/091632
PCT Pub. Date: May 24, 2018

(65) Prior Publication Data
US 2019/0283701 A1    Sep. 19, 2019

(30) Foreign Application Priority Data
Nov. 17, 2016 (DE) ............... 10 2016 122 167.8

(51) Int. Cl.
*B60R 21/207* (2006.01)
*B60R 21/231* (2011.01)
*B60R 21/00* (2006.01)

(52) U.S. Cl.
CPC .......... *B60R 21/207* (2013.01); *B60R 21/231* (2013.01); *B60R 2021/0004* (2013.01); *B60R 2021/23153* (2013.01)

(58) Field of Classification Search
CPC ............... B60R 21/207; B60R 21/231; B60R 2021/23153
See application file for complete search history.

(56) References Cited

U.S. PATENT DOCUMENTS 3,778,083 A * 12/1973 Hamasaki ............ B60R 21/276
280/739
3,779,577 A    12/1973 Wilfert
(Continued)

FOREIGN PATENT DOCUMENTS

DE    20 58 608 A1    6/1972
DE    195 40 911 A1    5/1997
(Continued)

OTHER PUBLICATIONS

Plaksin et al., Vehicle airbag, especially for rear seat passengers, May 7, 1997, EPO, DE 19 540 911 A1, Machine Translation of Description (Year: 1997).*
(Continued)

*Primary Examiner* — James A English
(74) *Attorney, Agent, or Firm* — Dickinson Wright PLLC

(57) ABSTRACT

A vehicle seat having an airbag unit for protecting a passenger sitting rear of the vehicle seat. The deployed airbag (30) extends from the rear side of the backrest of the vehicle seat into the vehicle rear direction. A support surface (32) of the airbag (30) is positioned above the attachment between the airbag unit (20) and the backrest and an impact surface (34) of the airbag (30) is located in front of a rear seated passenger. The airbag is relatively small and high positioned such that the impact surface (34) is positioned to exclusively contact the head of the passenger. In the state in which the airbag (30) is fully deployed but free of outer forces, the impact surface (34) defines an impact plane (IP) and a support surface (32) defines a support plane (SP). The impact plane (IP) and the support plane (SP) enclose a first angle (a) between 5° and 90°.

13 Claims, 6 Drawing Sheets

(56) References Cited

U.S. PATENT DOCUMENTS

| | | | |
|---|---|---|---|
| 6,557,887 B2* | 5/2003 | Wohllebe | B60R 21/207 |
| | | | 280/730.1 |
| 8,955,879 B2 | 2/2015 | Aranzulla et al. | |
| 2005/0116446 A1* | 6/2005 | Mabuchi | B60R 21/231 |
| | | | 280/728.2 |
| 2013/0341975 A1 | 12/2013 | Schneider et al. | |
| 2017/0361800 A1* | 12/2017 | Ohachi | B60R 21/207 |
| 2018/0111575 A1* | 4/2018 | Ghannam | B60R 21/0136 |
| 2018/0319358 A1* | 11/2018 | Schneider | B60R 21/231 |

FOREIGN PATENT DOCUMENTS

| | | |
|---|---|---|
| DE | 102 01 836 A1 | 8/2003 |
| DE | 10 2015 004 807 A1 | 12/2015 |
| DE | 10 2014 017 841 A1 | 6/2016 |
| EP | 2 358 568 B1 | 11/2014 |

OTHER PUBLICATIONS

Larsson et al., Vehicle with at least one vehicle seat and method for actuating a crash lock, Dec. 3, 2015, EPO, DE 10 2015 004 807 A1, Machine Translation of Description (Year: 2015).*
International Search Report and Written Opinion of PCT/EP2017/079547 dated Jan. 24, 2018.

* cited by examiner

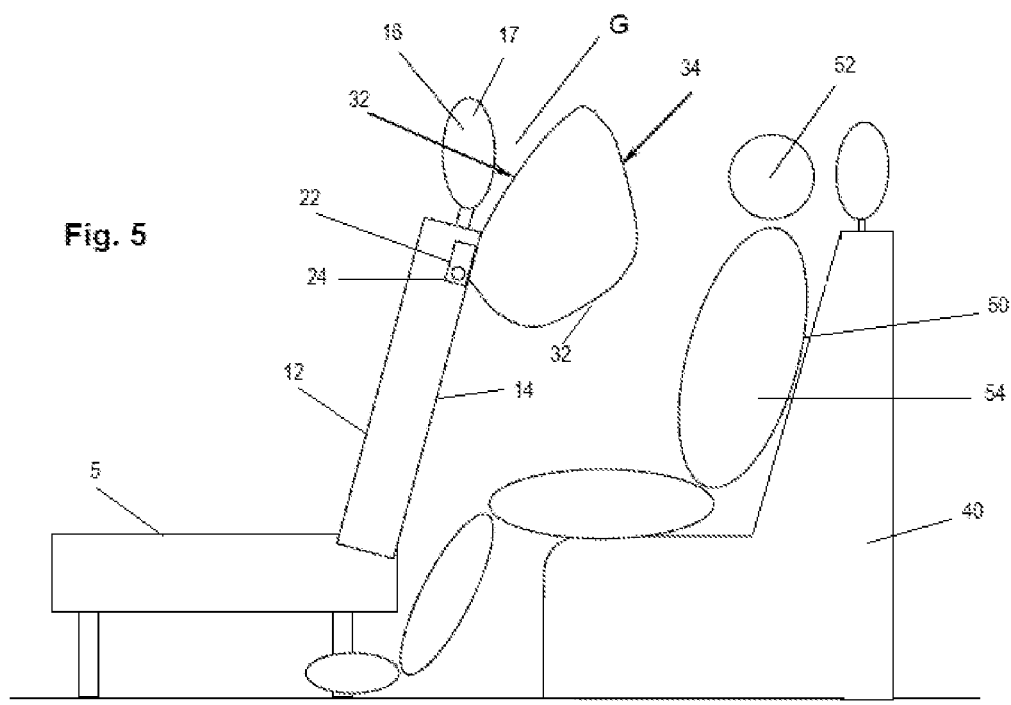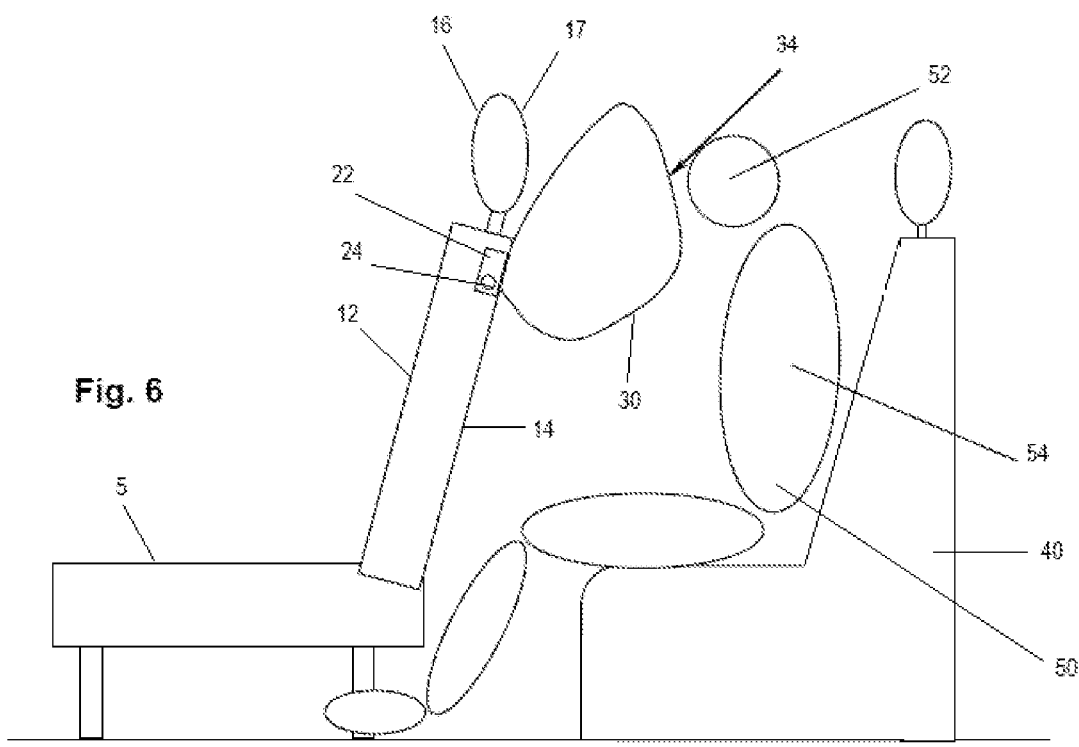

VEHICLE SEAT WITH AN AIRBAG UNIT AND AIRBAG UNIT ADAPTED FOR THE USE IN A VEHICLE SEAT

CROSS-REFERENCE TO RELATED APPLICATIONS

This application is a 35 U.S.C. § 371 national phase of PCT International Application No. PCT/EP2017/079547, filed Nov. 17, 2017, which claims the benefit of priority under 35 U.S.C. § 119 to German Patent Application No. 10 2016 122 167.8, filed Nov. 17, 2016, the contents of which are incorporated herein by reference in their entirety.

FIELD OF THE INVENTION

The invention relates to a vehicle seat including an airbag unit at the rear side of its backrest and an airbag unit adapted for the use in such a vehicle seat.

BACKGROUND

The use of frontal airbags protecting a passenger in case of a frontal crash or a laterally offset frontal crash is widespread in today's automotive technology. Almost every modern car has a frontal airbag for the driver and a frontal airbag for the front seated passenger. The frontal airbag for the driver is usually located in the hub area of the steering wheel and the frontal airbag for the front seated passenger is usually located inside the instrument panel. In most cases the frontal airbag for the passenger has a relatively large volume for the following reasons: First, it is often desired that the passenger frontal airbag does provide a good protection even for a non-belted passenger. Second, many belting systems for the front seated passenger have a force limiter for the belt in order to reduce the forces applied to the thorax of the passenger. Due to this the belt often does not hold the passenger at the end of the restraining process, such that he/she "falls" into the passenger airbag despite belt restraint.

Since for many years there exists the idea to implement a frontal airbag into the rear side of a front seat in order to give enhanced protection for a rear seated occupant. Such an idea if for example disclosed in DE 10 2015 004 807 A1 or US 2013/0341975 A. Generic DE 2 058 608 A1 shows a vehicle seat with an airbag module at or in the rear side of a backrest of a front seat. The deployed airbag of this airbag unit basically extends rearwards (in regards to the vehicle direction) and upwards from its connection to the backrest.

Despite the fact that the idea of providing a frontal airbag at the rear side of the backrest of a front seat exists since many years, this concept has not yet entered commercial practice.

Starting from this it is the task of embodiments of this invention to provide a vehicle seat with an airbag unit in or at its backrest for protecting a rear seated passenger that can be practically used with good results.

This task is solved by a vehicle seat and an airbag unit as described herein.

SUMMARY

A feature of embodiments of the invention is to design the airbag such that it restrains exclusively the head of the rear seated occupant and that it can move and/or tilt to some extend at least in the vehicle forward direction and to use mainly the headrest as a support. In order to provide these properties, the airbag (when fully deployed but free of outer forces) has an impact surface that defines an impact plane and a support surface that defines a support plane with the impact plane and the support plane enclosing an angle (denoted as first angle) between 5° and 90°, such that the upper region of the airbag has a basically wedge-shaped cross section.

Unlike a "classical" airbag for the front seated passenger the present airbag for the rear seated passenger does not restrain the thorax but only prevents the head from being bent too far into the direction of the chest and/or to the side.

It turned out that the relative small and high positioned airbag according to the invention gives very good additional protection due to the geometry and belt characteristics that are typical for the rear seated passenger. Especially the fact that the airbag according to the present invention is supported mainly by the headrest of the front seat (which may be integral or designed as a separate element) some drawbacks that might occur in connection with large airbags can be avoided. The airbag, especially its impact surface can move both, into the longitudinal direction of the vehicle as well as (at least to some extent) in its transversal direction, such that excessive forces in the neck of the passenger are avoided in many cases.

Further, the small volume and high position of the airbag has additional advantages. Due to the small volume the airbag can be deployed quickly without the need of a very high capacity inflator. This alone reduces the risk of injuries caused by the airbag in an out-of-position condition. Additionally, the airbag unit can be designed such that the airbag does not affect a baby carrier placed on the rear seat.

In a preferred embodiment of the present invention, the first angle is between 10° and 60°, so it is an acute angle. As has already been mentioned, the volume enclosed by the inflated airbag is relatively small, preferably less than 45 litres, or even more preferred less than 35 litres.

Since the airbag is designed to restrain exclusively the head of the occupant, the impact plane defined by the impact surface is preferably parallel to the vertical plane or is inclined towards the vertical plane in such a way that the impact plane points upwards and towards the rear.

In order to avoid that the head slips off the relatively small impact surface, the impact area should be basically flat. The preferred geometry of the impact surface is a square with an edge length of about 20 cm.

Since it is desired that the airbag can move to some extend when the head of the passenger contacts the impact surface, it is preferred that at least a section of the support surface is located at the height of the headrest but displaced from the same in the longitudinal direction of the vehicle such that a gap exists between the headrest and the support surface.

As will be described in more detail below, the outer skin of the airbag can be manufactured from a single cutting (single piece of fabric) which is closed by only two seams. This does not only make the production very efficient, this also gives an easy possibility to give the inflated airbag the desired shape. Additionally at least one shaping tether can be used.

BRIEF DESCRIPTION OF THE DRAWINGS

Embodiments of the invention will now be described in view of the figures. The figures show:

FIG. 5 is the same as FIG. 2, meaning a very early point in time of a frontal crash or a laterally offset frontal crash;

FIG. 6 is shown in FIG. 5 at a later point in time;

DETAILED DESCRIPTION

Figure 1:
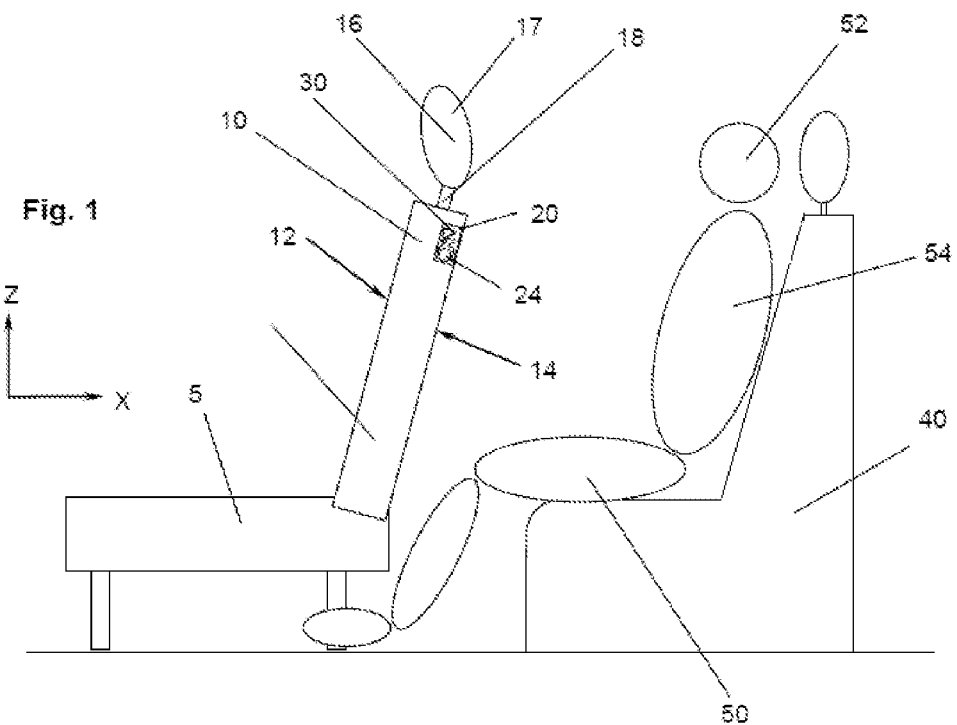
FIG. 1 is a very schematic representation of a front seat including an airbag unit according to the invention, a rear seat and a passenger/dummy seated on the rear seat.

FIG. 1 shows very schematically a front seat 5 and rear seat 40 of a motor vehicle, shown as a passenger car. The front seat 5 has a backrest 10 having a front side 12 pointing to the front of the vehicle and a rear side 14 pointing to the rear of the vehicle. The rear side 14 basically defines a plane. This plane is typically inclined towards the vertical (Z) direction at an angle between 15 and 30 degrees especially between 20 and 25 degrees. It should be noted that the invention is preferably implemented if the inclination of the backrest is within its typical range. Especially if the backrest 10 is inclined too far towards the horizontal plane (as is usually not the case if the rear seat 40 is occupied) the airbag unit provided in the backrest 10 (which will be described later) may not be capable of providing the desired protection to a passenger 50 seated on the rear seat 40.

A headrest 16 extends from the upper end of the backrest 10. In the embodiment shown this headrest 16 is an element separate from the backrest 10 and is comprised of a bolster 17 and at least one support element (usually in form of a bar or rod) 18 connecting this bolster 16 to the backrest 10. It needs to be emphasised here that in other embodiments of the invention (not shown in the pictures) the headrest 16 could also be integral with the backrest 10.

An airbag unit 20 is located in or at the rear side 14 of the backrest 10 at its upper end region (under the headrest 16). This airbag unit 20 includes an inflator 24 (usually in form of a gas generator) and an airbag 30. The airbag 30 has (as every airbag) an outer skin and may also include one or more tethers for shaping this outer skin (not shown). As no tethers are shown in the described embodiment, the term "airbag" will sometimes be used instead of the term "outer skin of the airbag" for the sake of linguistic simplicity. The airbag unit 20 may include a housing 22 into which the airbag 30 is folded. The outer skin of the airbag is directly or indirectly attached to the backrest, from example to its frame.

Figure 2:
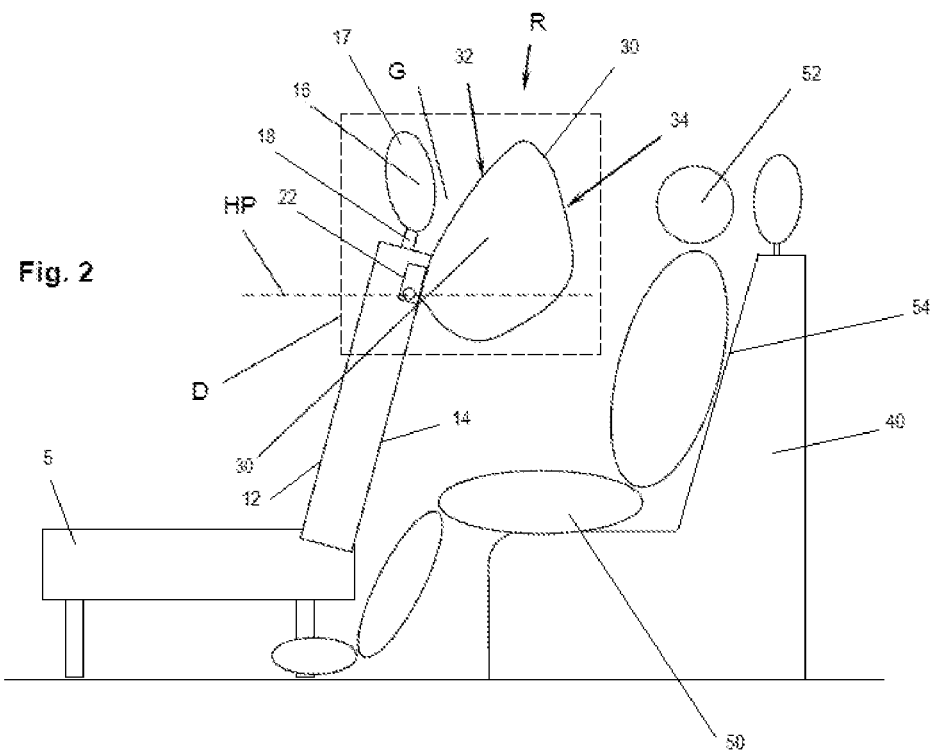
FIG. 2 shows the items in FIG. 1 of the airbag unit being fully deployed.

FIG. 2 shows the same as FIG. 1 but with the airbag 30 being fully deployed, but free of outer forces (meaning that the passenger 20 has not yet contacted the airbag 30). The backrest 10 is within its standard inclination range between 15° and 30° to the vertical.

Figure 3:
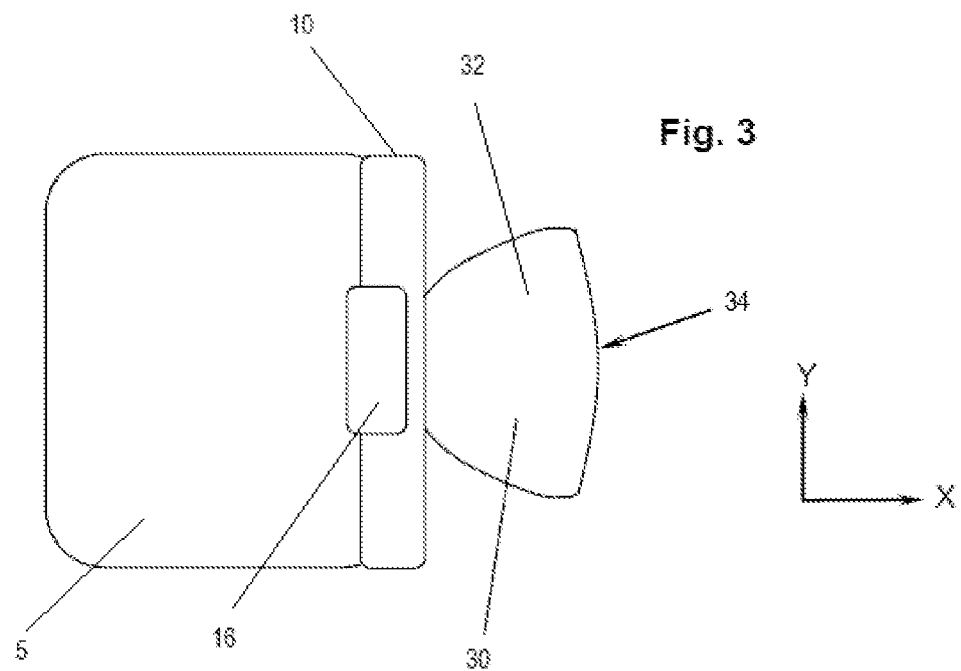
FIG. 3 is a top view from direction R in FIG. 2.
Figure 4:
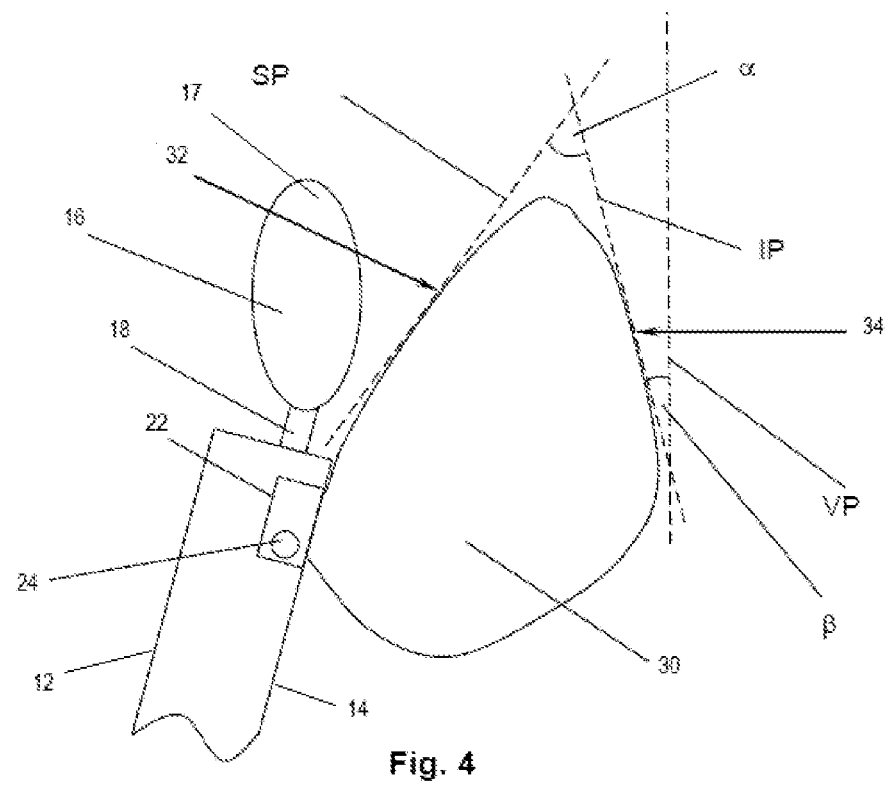
FIG. 4 is the detail D of FIG. 2 and geometrical planes relevant for the invention.

The position and shape of the airbag 30 (meaning its outer skin) is now described in more detail in view of FIGS. 2 to 4. As one can see especially from FIG. 2 the major part (usually more than 80% in view of the volume) of the fully deployed airbag 30 is located above its lowest attachment to the backrest 10 (in order to show this a horizontal plane HP cutting the lowest attachment point is drawn in FIG. 2). This means that the airbag 30 basically extends to the rear and upwards. The airbag 30 encloses a volume of less than 45 litres and preferably less than 35 litres. At least the upper part of the airbag 30 has a basically triangular- or wedge-shaped in cross section with a support surface 32 positioned above the attachment of the airbag 30 to the backrest 10 basically rear of the headrest 16 but (in the state before the passenger contacts the airbag) separated from the same such that there is a gap G between this support surface 34 and the headrest 16. The support surface 32 can be looked at as being basically flat such that it defines a support plane SP (as shown in FIG. 4).

The airbag 30 further forms an impact surface 34 which can also be looked at as being basically flat such that it defines an impact plane IP. The support plane SP and the impact plane IP enclose a first angle α which is between 5° and 90°, preferably between 10° and 60°. In this manner the cross section of at least the upper area of the airbag 30 basically forms a triangle. As long as the backrest 10 is within its standard inclination range between 15° and 30° (usually between 20° and 25°) the angle β (FIG. 4) between the impact plane IP and the vertical plane VP (referred to as inclination angle) is between 0° and 45° such that the impact plane IP is either basically parallel to the vertical plane VP or points rearwards and upwards as is shown in FIG. 4.

In the embodiment shown the impact surface 34 is basically a square with side lengths of around 20 cm.

As is shown in FIG. 3 the width (in Y direction) of the basically flat impact surface 34 exceeds the width of the base of the airbag 30 attached to the backrest 10 and the width of the headrest 16.

The geometry just described leads to an overall geometry and crash behaviour as is described now in view of FIGS. 5 to 8:

FIG. 5 shows the situation at the very beginning of the restraining process after a frontal crash or a laterally offset frontal crash has been detected. As is shown in FIG. 5, the airbag 30 is fully deployed very quickly when the passenger 50 is still almost in his initial seating position. The impact surface 34 is located in front of the head 52 of the passenger 50 and the support surface 32 is located basically (more or less completely) rear of the headrest 16 with the gap G between the headrest 16 and the support surface 32.

As can be seen from FIG. 6 the passenger 50 now starts to move with the head 52 moving quicker than the thorax 45, especially because the passenger 50 is preferably (although not shown) belted.

Figure 7:
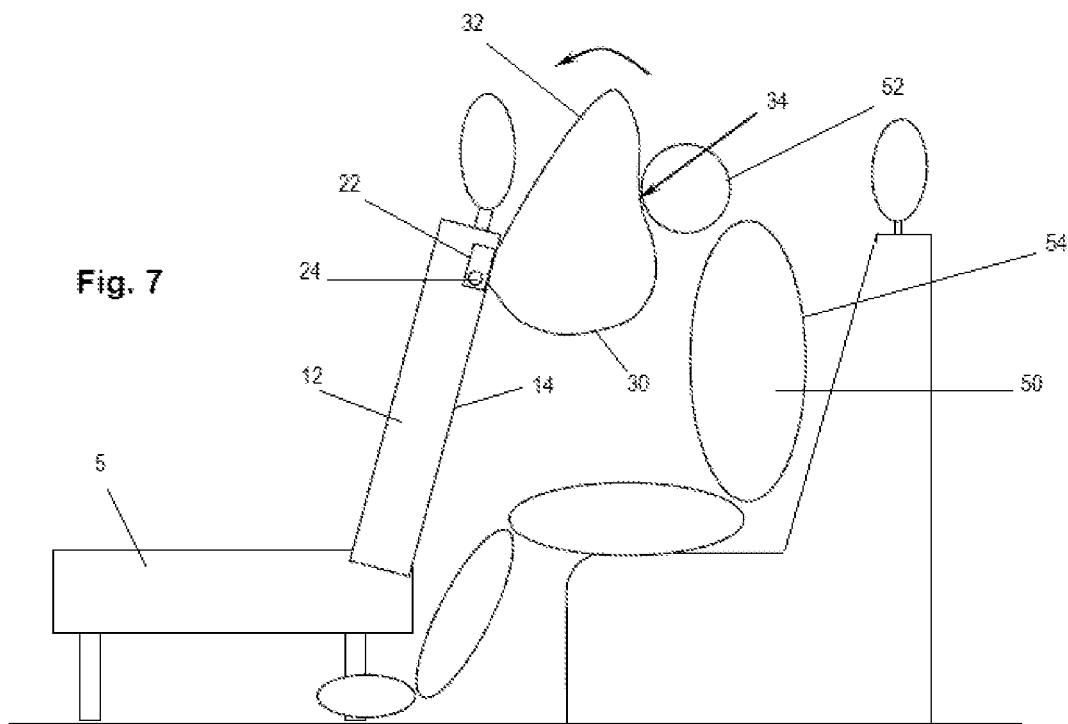
FIG. 7 is shown in FIG. 6 at an even later point in time.
Figure 8:
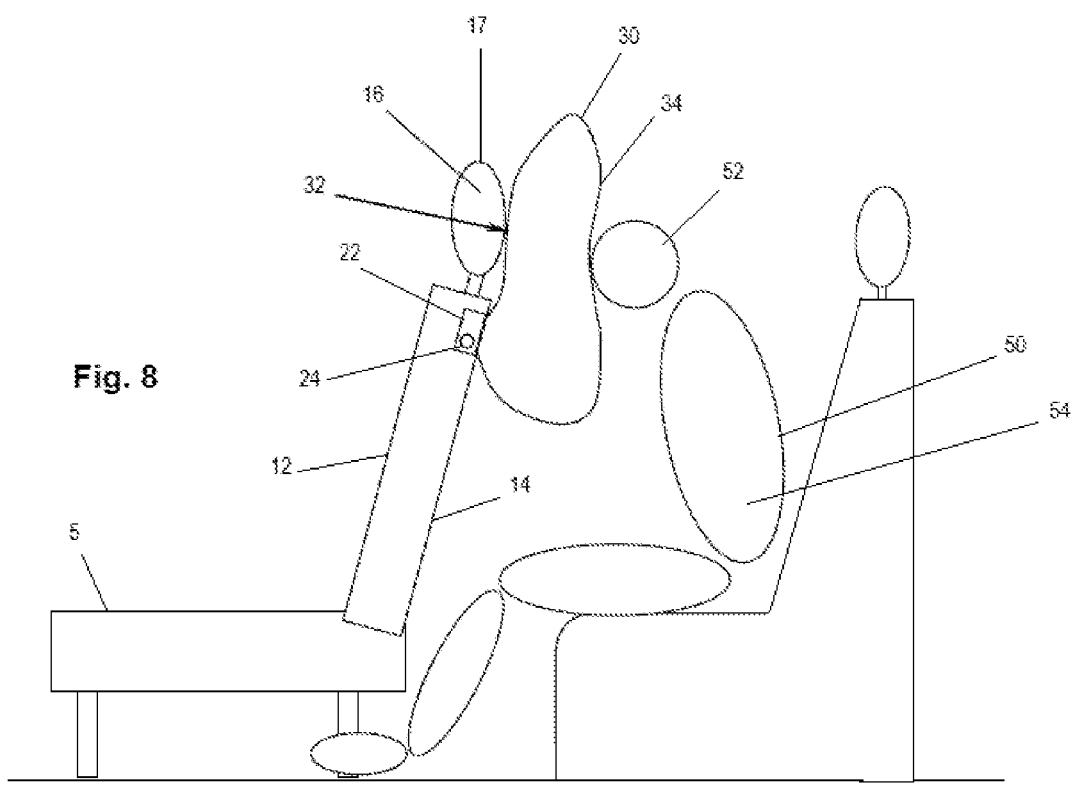
FIG. 8 is shown in FIG. 7 at an even later point in time.

Next, (as is shown in FIG. 7) the head 52 hits the impact surface 34. After that the airbag 30 may tilt into the direction of the arrow shown in FIG. 7 and deform until the support surface 32 abuts the headrest 16. So, the head 52 of the passenger 50 is restrained relatively softly. The restraining of the head avoids a bending of the neck too far into the direction of the chest but without applying too high forces to the neck of the passenger. After the support surface has hit the headrest 16 the airbag 30 will continue to deform because gas is ventilated through at least one (not shown) ventilation opening of the airbag 30.

Because of the described geometry the airbag 30 in total or at least its impact surface 34 can also move to some extent in the transversal (Y direction) after the impact surface is hit by the head of the passenger such that the forces applied to the neck of the passenger stay relatively low even in case of laterally offset frontal crash.

Figure 9:
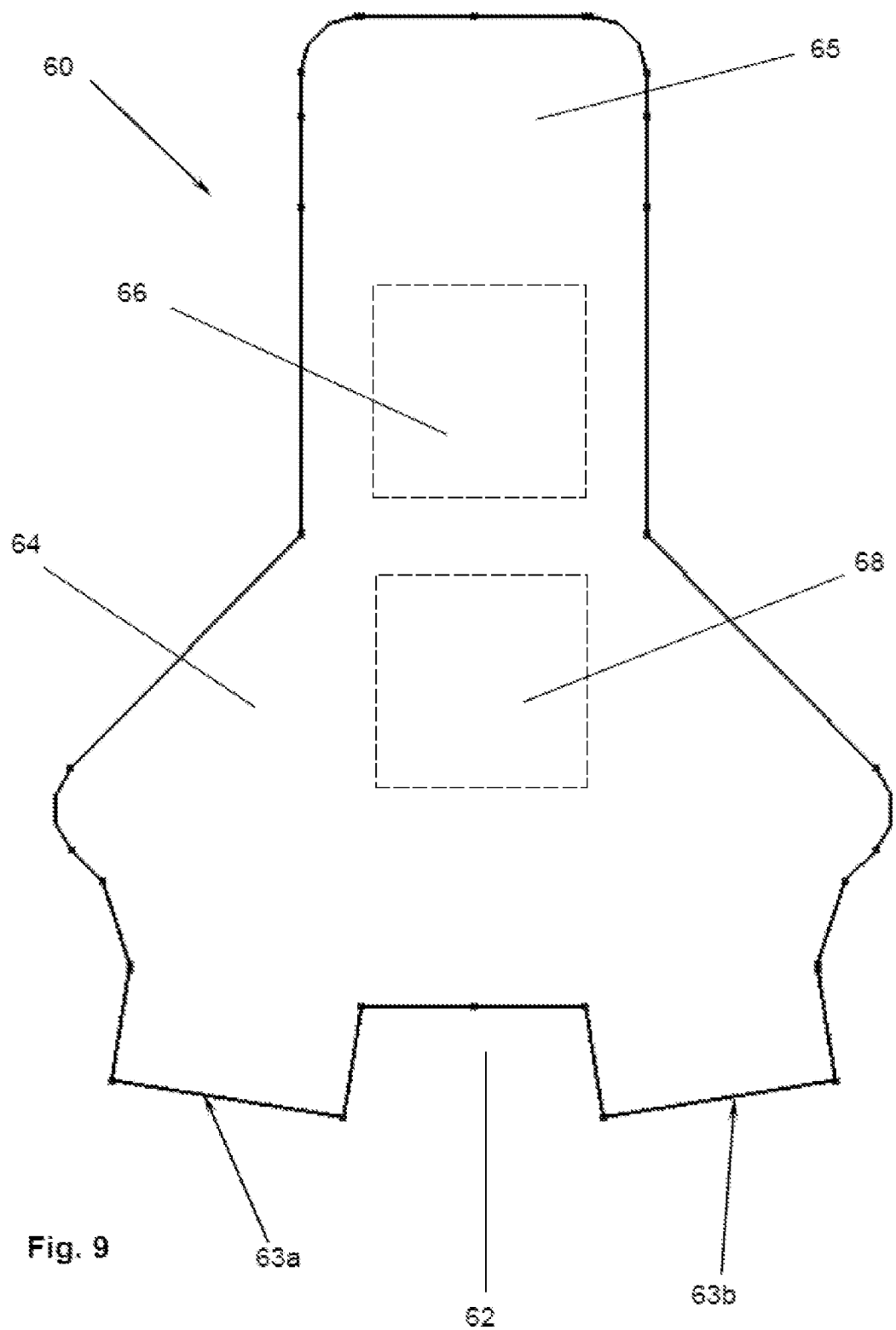
FIG. 9 is a cutting for manufacturing an airbag as is shown in FIGS. 2 to 8.

FIG. 9 shows a cutting (fabric blank) 60 for manufacturing an airbag as described above from a single cutting by means of applying only two seams to this cutting which makes the manufacturing process of this airbag quite efficient despite its quite complex three-dimensional shape. The cutting 60 of this embodiment is mirror symmetric as one can easily see. In the middle of its lower end (lower means here simply at the lower end of the drawing) this cutting 60 has a cut-out 62 which will form the inflation opening of the airbag after the finishing of the production process. Left and right of this cut-out 62 there are two edges 63a and 63b. Above the cut-out 62 and the two edges 63a and 63b there is a wider middle section 64, and a narrower end portion 65 extends from this wider middle section 64. The position 66 of the impact surface and the position 68 of the support surface are shown in FIG. 9.

Figure 10:
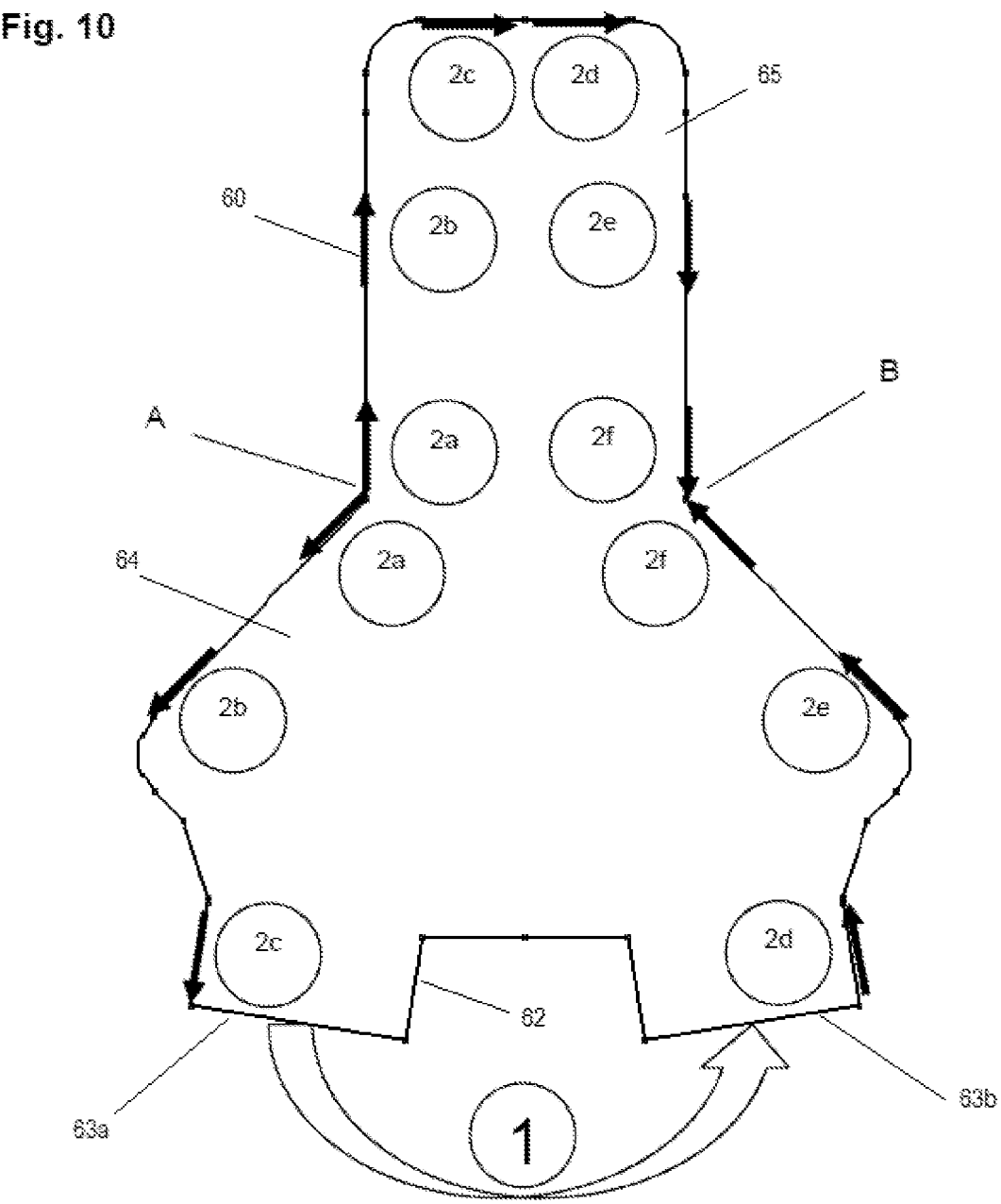
FIG. 10 is the cutting of FIG. 9 with signs and arrows indicating the sewing process.

The sewing process is now described in view of FIG. 10 which shows the cutting of FIG. 9 with additional marks for clarifying this sewing process.

First, the two edges 63a and 63b are sewn together by means of a first seam (designated by the arrow 1), wherein it is preferred that these two edges are anti-parallel orientated (meaning that they show in different directions such that this first seam which is applied to these two edges is a shear seam). Now the remaining edges of the cutting (except the edges encircling the cut-out 62) are placed on one another as follows: Edge region 2a lies onto edge region 2a, edge region 2b lies on region 2b and so forth. In each case the seam regions have in the identical designations in FIG. 10 (2a-2f) are placed together for stitching. The second seam starts at point A and is sewn until point B. By this second seam the cutting 60 is now (except the inflation opening) completely closed such that an airbag 30 as is shown in the figures is created.

While the above description constitutes the preferred embodiment of the present invention, it will be appreciated that the invention is susceptible to modification, variation and change without departing from the proper scope and fair meaning of the accompanying claims.

The invention claimed is:

1. A vehicle seat comprising;
a backrest with a front side and a rear side,
a headrest extending from an upper portion of the backrest, and
an airbag unit comprising an airbag having an outer skin and an inflator, the airbag unit being attached to or accommodated in an upper region of the backrest such that the airbag in a deployed state extends from the rear side of the backrest into the vehicle rear direction with a support surface, the airbag enclosing gas generated from the inflator and being positioned above an attachment between the airbag unit and the backrest, and with an impact surface of the airbag being located in a position in front of a rear seated passenger,
wherein, in the deployed state of the airbag, but free of outer forces, the impact surface defines an impact plane, the support surface defines a support plane, and the impact plane and the support plane enclose a first angle between 5° and 90°, and more than 80% of a volume of the gas enclosed by the airbag is located above a horizontal plane cutting a lowest attachment of the airbag to the backrest, and
wherein, in the deployed state, the airbag encloses the volume of less than 45 litres.

2. The vehicle seat according to claim 1 further comprising in that the first angle is between 10° and 60°.

3. The vehicle seat according to claim 1 further comprising in that in a case that the backrest is within a position range with an inclination angle between 0° and 30°, the impact plane is parallel to a vertical plane or is inclined towards the vertical plane in such a way that the impact plane points upwards and towards the vehicle rear direction.

4. The vehicle seat according to claim 3 further comprising in that the inclination angle of the impact plane to the vertical plane is between 15° and 30°.

5. The vehicle seat according to claim 1 further comprising in that the impact surface is positioned exclusively to contact the head of the rear seated passenger.

6. The vehicle seat according to claim 1 further comprising in that the impact surface is basically flat.

7. The vehicle seat according to claim 6 further comprising in that the impact surface has a surface area of between 300 $cm^2$ and 500 $cm^2$.

8. The vehicle seat according to claim 6 further comprising in that the impact surface is basically a square.

9. The vehicle seat according to claim 1 further comprising in that in the deployed state of the airbag but free of outer forces, at least a section of the support surface is located at the height of the headrest but displaced from the headrest in the longitudinal direction of the vehicle such that a gap exists between the headrest and the support surface.

10. The vehicle seat according to claim 1 further comprising in that the headrest is separate from the backrest and attached to the backrest via at least one support element of the headrest.

11. The vehicle seat according to claim 1 further comprising in that the headrest is integral with the backrest.

12. The vehicle seat according to claim 1 further comprising in that the outer skin of the airbag is manufactured from a single cutting.

13. The vehicle seat according to claim 12 further comprising in that the single cutting is closed in order to form the outer skin of the airbag by two seams.

* * * * *